(12) United States Patent
Quitoriano et al.

(10) Patent No.: US 10,559,211 B2
(45) Date of Patent: Feb. 11, 2020

(54) REAL-TIME SERVICE PROVIDER PROGRESS MONITORING

(71) Applicant: Uber Technologies, Inc., San Francisco, CA (US)

(72) Inventors: Ashley Quitoriano, Burlingame, CA (US); Kevin Spieser, San Francisco, CA (US); Parijat Mazumdar, San Mateo, CA (US); Rei Chiang, San Francisco, CA (US); Shicong Meng, Fremont, CA (US); Zhi Li, Emeryville, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/196,827

(22) Filed: Nov. 20, 2018

(65) Prior Publication Data

US 2019/0164432 A1   May 30, 2019

Related U.S. Application Data

(60) Provisional application No. 62/591,037, filed on Nov. 27, 2017.

(51) Int. Cl.
*G08G 1/00* (2006.01)
*H04W 4/029* (2018.01)

(52) U.S. Cl.
CPC .......... *G08G 1/205* (2013.01); *H04W 4/029* (2018.02); *G08G 1/202* (2013.01)

(58) Field of Classification Search
CPC .......... G08G 1/00; G08G 1/127; G08G 1/202; G08G 1/205; G01C 21/362;
(Continued)

(56) References Cited

U.S. PATENT DOCUMENTS

| | | | |
|---|---|---|---|
| 2009/0192851 A1* | 7/2009 | Bishop | G06Q 10/08 |
| | | | 705/26.3 |
| 2012/0130627 A1* | 5/2012 | Islam | G06Q 10/08 |
| | | | 701/300 |

(Continued)

FOREIGN PATENT DOCUMENTS

| | | |
|---|---|---|
| CN | 202443493 | 9/2002 |
| CN | 104537831 | 4/2015 |

(Continued)

OTHER PUBLICATIONS

ISR and Written Opinion in PCT/US2018/062084 dated Feb. 22, 2019.

(Continued)

*Primary Examiner* — Hung T Nguyen
(74) *Attorney, Agent, or Firm* — Mahamedi IP Law LLP

(57) ABSTRACT

A network computer system provides a service instruction to a computing device. The service instruction can include offers, such as a service request to pick up and transport a user, and recommendations, such as a movement recommendation encouraging the service provider to relocate to another geographic area. The network computer system remotely monitors the computing device to receive a current position of the computing device as the service provider travels within a geographic area. The network computer system remotely monitors the computing device to receive a service state of the service provider. The network computer system periodically determines whether the service provider is making progress towards a target of the service instruction based on the current position of the computing device and a set of progress conditions, including determining whether the service provider satisfied the set of progress conditions in response to a change in the service state.

20 Claims, 8 Drawing Sheets

(58) Field of Classification Search
CPC .. G01C 21/3676; H04W 4/021; H04W 4/023; H04W 4/027; H04W 4/029
USPC ..... 340/991, 992, 993, 994; 455/456.1, 457; 701/200, 300; 705/1, 7, 7.13, 417
See application file for complete search history.

(56) References Cited

U.S. PATENT DOCUMENTS

| | | | |
|---|---|---|---|
| 2012/0232943 A1* | 9/2012 | Myr | G06Q 10/04 705/7.13 |
| 2014/0051465 A1* | 2/2014 | Ruys | G08G 1/202 455/457 |
| 2015/0348221 A1 | 12/2015 | Pedersen | |
| 2016/0247247 A1 | 8/2016 | Scicluna | |
| 2017/0052034 A1* | 2/2017 | Magazinik | G01C 21/3438 |
| 2018/0302743 A1* | 10/2018 | Bai | H04W 4/021 |

FOREIGN PATENT DOCUMENTS

| | | |
|---|---|---|
| WO | WO 2012/0167319 | 12/2012 |
| WO | WO 2016/0127109 | 8/2016 |
| WO | WO 2017/0132447 | 8/2017 |

OTHER PUBLICATIONS

ISR and Written Opinion in PCT/US2018/062297 dated Feb. 13, 2019.

\* cited by examiner

REAL-TIME SERVICE PROVIDER PROGRESS MONITORING

CROSS-REFERENCE TO RELATED APPLICATIONS

This application claims the benefit of U.S. Patent Application No. 62/591,037, filed Nov. 27, 2017, which priority application is hereby incorporated by reference in its entirety.

BACKGROUND

A network service can enable users to request and receive various services, such as ride-sharing, through applications on mobile computing devices. The network service selects one of many service providers to fulfill the request based on user-specified data from the request. These service providers can interact with the network service to accept or decline service requests, receive data about the requesting users, and set various service states such as whether the provider is offline or online and available to fulfill requests.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
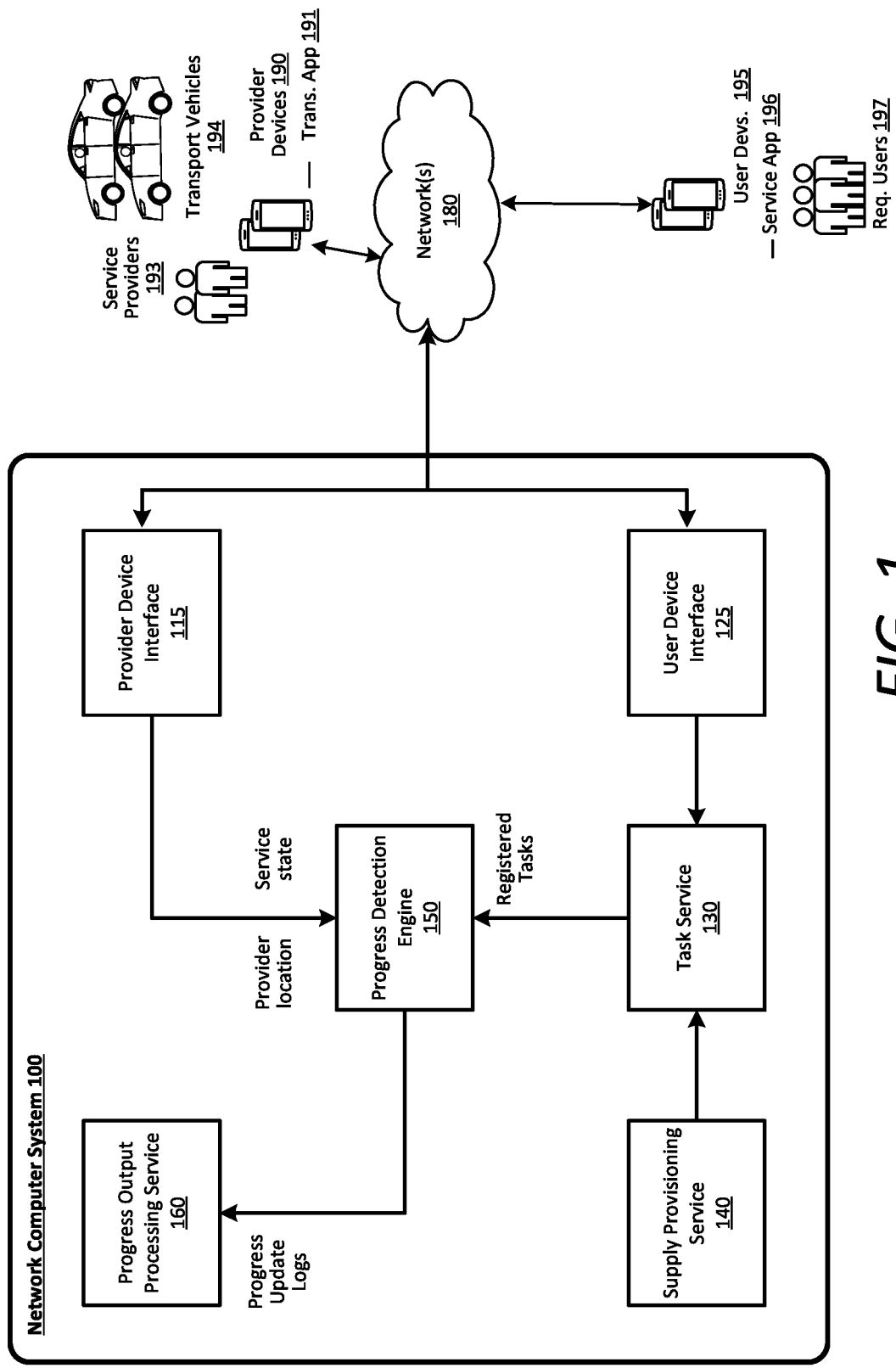
FIG. 1 is a block diagram illustrating an example network computer system in communication with user and transport provider computing devices, according to examples described herein.

On-demand transport services (e.g., passenger transport or delivery services) can be managed by a network-based computing system by connecting requesting users with service providers (e.g., drivers) that utilize a designated transport service application. The designated application can execute on a computing device of the service provider to receive, from the network computer system, invitations to provide transport services for requesting users. A corresponding service application can execute on a computing device of the requesting user to enable the user to configure and transmit transport requests to the network computer system. The network computer system can receive location data from the computing devices of the requesting users and service providers to coordinate the transport services throughout the transport service region (e.g., an urban metroplex or bounded geographic region). For example, the network computer system can match requesting users with proximate service providers based on an estimated time of arrival, distance, map data, and other more intricate matching models.

A current technical problem in the field of on-demand transport is in managing the supply distribution of service providers throughout a transport service region to match the demand from users, an imbalance in which can result in local pockets of oversupply and undersupply conditions, sometimes quite severely. Providing movement recommendations to service providers can achieve an effect of smoothing the supply conditions over an entire region, but creates further difficulties. For example, not all service providers who receive a recommendation to move to another area will comply. They might need gas, want to stay in their current area, or be stuck in traffic. In addition, the assumptions behind the movement recommendations should be analyzed in order to provide more accurate recommendations that benefit both service providers and users.

Another problem in the field of on-demand transport is fraud detection. In one example, in order to discourage users from cancelling rides after a service provider has already made significant progress, the network computer system could charge the user a cancellation fee in order to reimburse the service provider for their time. However, a service provider could possibly abuse the cancellation fee by agreeing to pick up a user and then ignoring them.

According to examples, a real-time progress monitoring system detects the progress of a service provider towards a target destination or multiple target destinations. In some examples, the monitoring is performed using a "shrinking circle attraction engine," which applies a "shrinking circle algorithm" to determine whether the service provider is progressing towards one of the targets or ignoring it. As the circle towards a service provider's estimated time to arrival (ETA) shrinks, the system interprets this as the service provider moving closer towards a target. The engine operates by detecting a service provider's location change from one sub-region to another and recategorizing the change as an "attraction state" of the service provider (e.g., toward the target, ignoring the target, inside the sub-region with the target).

The real-time progress detection system can determine whether service providers are following repositioning recommendations while offline and determine if a service provider is progressing toward the pickup location once they accept a service request, which can be used to detect service provider fraud and attempts to game the system. For example, a service provider may accept a request but have no intention of picking up the requesting user so that they can get a cancellation fee. To prevent such fraud, any cancellation fee can be waived for the user if the progress detection system detects that the service provider was ignoring the pickup. In other cases, the fare can be adjusted if the service provider was not making sufficient progress towards the destination on a ride. In some use cases, warnings can be sent to the service provider indicating that the service provider is not progressing towards the target. The progress detection system further provides a feedback loop for movement recommendations to service providers to improve supply provisioning. For example, the progress detection system can determine what percent of service providers are following a recommendation, and if too many or too few are following, the supply provisioning service can adjust accordingly. The progress detection system can also improve the quality of recommendations by testing assumptions about the benefits provided by the recommendations.

In some aspects, the network computer system provides to a computing device of a service provider over a network a service instruction. The service instruction can include offers, such as a service request to pick up and transport a user, and recommendations, such as a movement recommendation encouraging the service provider to relocate to another geographic area that is determined to offer a superior experience for the service provider (e.g., lower idle time, more revenue, etc.).

The network computer system remotely monitors the computing device to receive provider data corresponding to a current position of the computing device, as determined by a location-based resource of the computing device, as the service provider travels within a geographic area. In addition, the network computer system remotely monitors the computing device to receive provider data corresponding to a service state of the service provider (e.g., open, occupied, offline, etc.).

The network computer system periodically determines whether the service provider is making progress towards a target (e.g., a pick up location, movement recommendation location) of the service instruction based on the current position of the computing device and a set of progress conditions. Responsive to a change in the service state of the service provider, the network computer system determines whether the service provider satisfied the set of progress conditions. In some aspects, the network computer system tracks multiple movement recommendations for a service provider and determines whether the service provider is satisfying or not satisfying each of the recommendations.

In some implementations, a progress detection engine operates as a backend service that monitors whether the service provider is making progress towards the target. It evaluates whether the service provider motion meets expectations based on an initial estimated time to arrival (ETA), a current remaining ETA, and the actual time elapsed since the service provider accepted the service instruction.

In one example, the progress detection engine determines the initial ETA to the target of the service instruction from a starting position of a computing device of a service provider within a geographic area. The progress detection engine remotely monitors the computing device to receive provider data corresponding to the current position of the computing device, as determined by a location-based resource of the computing device, as the service provider travels within the geographic area.

The progress detection engine updates a remaining ETA to the specified location from the current position of the computing device and the duration of time elapsed since the service provider accepted the service instruction. The progress detection engine then compares the remaining ETA, the duration of time elapsed, and the initial ETA to a predetermined threshold to determine whether the service provider is progressing towards the specified location.

In one implementation, to track progress in real-time, the progress detection engine reads logs of service provider location and service status that are processed by upstream services. If the remaining ETA+duration elapsed−initial ETA<=a threshold of the greater of 2 minutes or the initial ETA*a predetermined buffer value, the service provider is considered to be progressing towards the target. Otherwise, the service provider is considered to be ignoring the target. The shrinking circle attraction engine also tracks whether the service provider is inside or outside the target sub-region. Once the service provider's service state changes to indicate that a given task (e.g., pick up, drop off, movement recommendation) is complete (whether successful or canceled), the progress detection system stops tracking the service provider and logs the relevant information, including the task, a timestamp, the service provider ID, and whether the task ended in failure or success.

Among other benefits, the network computer system can leverage progress detection to measure the progression/attraction and base signals for movement recommendations, log statistics in real time, and build a data store as single source of truth for essential stats related to movement recommendation. Based on progression and core signals, the network computer system can better define core metrics to measure direct and indirect impacts of movement recommendations, analyze them, and visualize them over time. Furthermore, progress detection can act as a first step in identifying potential issues over service provider experience and be used in investigations of service provider behavior.

As provided herein, the terms "user" and "service requester" are used throughout this application interchangeably to describe a person or group of people who utilize a service requester application on a computing device to request, over one or more networks, on-demand services from a network computer system. The term "service provider" is used to describe a person utilizing a service provider application on a computing device to provide on-demand services to the service requesters.

As provided herein, a computing device refers to devices including desktop computers, cellular devices or smartphones, personal digital assistants (PDAs), laptop computers, virtual reality (VR) or augmented reality (AR) headsets, tablet devices, televisions (IP Television), etc., that can provide network connectivity and processing resources for communicating with the system over a network. A computing device can also correspond to custom hardware, in-vehicle devices, on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried out or executed. In particular, the numerous machines shown in some examples include processors and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer devices) and magnetic memory. Computers, terminals, network-enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of interconnected logic gates. Such circuits are typically designed using a hardware description language (HDL), such as Verilog or VHDL. These languages contain instructions that ultimately define the layout of the circuit. However, once the circuit is fabricated, there are no instructions, and the processing is performed by interconnected logic gates.

System Description

FIG. 1 is a block diagram illustrating an example network computer system in communication with user and service provider devices, in accordance with examples described herein. In various examples described herein, the network computer system 100 can include a task service 130, a supply provisioning service 140, a progress detection engine 150, and a progress output processing service 160. The network computer system 100 can further include a user device interface 125 to communicate with user devices 195 of requesting users 197 over one or more networks 180 (e.g., via an executing service application 196). The network computer system 100 can further include a service provider device interface 115 that communicates with service provider computing devices 190 of service providers 193 (e.g., transport providers) over the network(s) 180 (e.g., via an executing a service application 191). The service providers 193 can each operate a transport vehicle 194 accordingly to provide on-demand transport services coordinated by the network computer system 100.

According to various examples, the service providers 193 can each utilize a service provider device 190 (e.g., a mobile computing device) to execute a transport application 191 that links the service provider device 190 with the service provider device interface 115 of the network computer system 100. The service provider device interface 115 can access location data, indicating the dynamic location of the service provider 193, from a location-based resource (e.g., a GPS module) of the service provider device 190 via the executing transport application 191. In addition to receiving the service provider's location, the service provider device interface 115 can transmit service requests to the service providers 193 via the transport application 191 to enable the service providers 193 to receive the requests and perform corresponding services for the requesting users 197.

For example, the requesting users 197 can execute a service application 196 on their user devices 195 (e.g., mobile computing devices) to configure and transmit a pick-up request, a food delivery request, a package or mail delivery request, and the like. The requesting users 197 can transmit the requests to the user device interface 125 of the network computer system 100 over the one or more networks 180. In various implementations, the requesting users 197 can make on-demand transport requests for any pick-up location and destination within the transport service region.

When one of the service providers 193 accepts a service request, the network computer system 100 can update the service state for the service provider 193 to reflect an in-service status. Among other potential service states, service providers 193 throughout the transport service region can be classified by the network computer system 100 as unavailable or offline, available or online (i.e., "open"), and in-service.

According to various examples, the network computer system 100 can partition the transport service region into a plurality of geographic sub-regions or areas based on population, number of users, surface area, etc. In some aspects, these sub-regions (or "geos") are hexagonally shaped and form a lattice that covers the transport service region. The network computer system 100 can further collect and store historical supply/demand data for the transport service for each of the partitioned areas. The network computer system 100 can also monitor real-time supply/demand data for each of the partitioned areas. Based on the historical and/or real-time data, the partitioned areas can be scored and/or ranked, or otherwise classified as oversupplied or undersupplied with regards to available service providers. For example, progressively lower scoring service areas may indicate undersupply, and the network computer system 100 can initiate certain mitigating measures to more evenly distribute transport supply (e.g., service providers that can provide transport services) throughout the transport service region. In certain variations, the score of a partitioned service area may also be based on current traffic conditions within the service area and/or the surrounding service areas.

In accordance with various implementations, the scored service areas can enable the supply provisioning service 140 to construct and update a supply distribution model for the entire transport service region. In scoring each service area, the supply provisioning service 140 can monitor the requesting users 197 (e.g., users that have submitted a transport request) versus service providers 193 having an available status within the service area. In certain aspects, when a service area has the same or similar number of available service providers as requesting users, or submitted transport requests, at any given time, the service area can be classified as being in equilibrium. It is contemplated that an equilibrium condition is ideal for the entire transport service region, such that any transport demand condition within any service area can be readily met with an equal service provider supply condition. In accordance with some examples, the supply provisioning service 140 can generate a dynamic score for each service area based on current supply/demand conditions, as well as one or more forecasted supply demand scores based on the historical data for each sub-region (e.g., a forecasted score for five minutes, ten minutes, or an hour into the future).

Certain strategies utilized by examples described herein involve the coordination of service providers 193 in such a manner that service provider supply tends to move or migrate from oversupplied service areas to undersupplied service areas. Such strategies can involve real-time notifications to the service providers 193 of the supply/demand conditions. Based on the model, the supply provisioning service 140 can take measures to distribute service providers from oversupplied service areas to undersupplied service areas. For example, the supply provisioning service 140 can generate movement recommendations to service providers in oversupplied areas that encourage those service providers to relocate to undersupplied areas in order to balance the supply and demand within the transport service region.

Based on the movement recommendations generated by the supply provisioning service 140, the task service 130 can register tasks to track the progress of any movement recommendations sent to service providers 193. In addition, requests for service (e.g., pick up requests) can be processed through the user device interface 125 and result in the task service 130 registering a task to track the progress of the selected service provider 193 towards the pick up location. In further examples, the task service 130 can register a task to track the progress of the selected service provider 193 towards a drop off location for a user during a ride.

In some examples, the progress detection engine 150 implements a shrinking circle attraction engine, which applies a shrinking circle algorithm to determine whether the service provider 193 is progressing toward the target of the task or ignoring it. As the circle towards a service provider's estimated time to arrival (ETA) shrinks, the shrinking circle attraction interprets this as the service provider 193 moving closer toward the target. The engine operates by detecting a service provider's location change from one sub-region to another and recategorizing the change as an attraction state of the service provider 193 (e.g., toward the target, ignoring the target, inside the sub-region with the target).

In one implementation, to track progress in real-time, the progress detection engine 150 reads logs of service provider location and service state that are processed by upstream services (not illustrated). On receiving a location update of a service provider 193, the progress detection engine 150 loads existing attractions related to the service provider 193 from a database, and for each attraction task, updates the attraction states based on the estimated time to arrival and time elapsed, then processes compliance updates. In some examples, the progress detection engine 150 updates attraction states each time the service provider 193 crosses from one sub-region to another or every 60 seconds if the service provider 193 remains within one sub-region during that time.

On receiving a service state update for a service provider 193, the progress detection engine 150 can update a list of service providers 193 for general use cases of attraction measurement. For positioning compliance, if the state is in "begin" status (e.g. open), the progress detection engine 150 creates attraction states for existing attractions, tied to available tasks. If the service provider's service state changes to indicate that a given task (e.g., pick up, drop off, movement recommendation) is complete (whether successful or canceled), the progress detection system stops tracking the service provider and logs the relevant information, including the task, a timestamp, the service provider ID, and whether the task ended in failure or success.

In some aspects, a progress output processing service 160 can perform various actions by processing logs of progress updates that the progress detection engine 150 writes. In one example, the progress output processing service 160 can determine whether service providers are following repositioning recommendations while online and not in-service. The progress detection system further provides a feedback loop for movement recommendations to service providers to improve supply provisioning. For example, the progress detection system can determine what percent of service providers are following a recommendation, and if too many or too few are following, the supply provisioning service 140 can adjust accordingly.

Data from the progress update logs can also be used to improve the quality of recommendations by testing assumptions about the benefits provided by the recommendations. For example, answers to several scenarios may be informative to improve the quality of recommendations: What are the impact/effects of movement recommendations, that is, how do they affect service providers' driving experience over time? What benefits do service providers actually see following movement recommendations? What happens if they choose not to follow? Does this increase their ATR (actual time to request), or lower their ATR? What's the general distribution of ATR for service providers who follow/ignore recommendations? If service providers are following, do service providers get dispatches along the way, or only once they arrive at the target? Given a time range, how many of service providers targeted by movement recommendation arrived at the target? After arriving at the target, do they get dispatches, or wait for a long time then go offline? Is the ranking logic for choosing recommendations based on solid assumptions, that is, is ETA accurate? If service providers are following recommendations and arrive at the target, what's the difference between ATA (actual time to arrival) and initial ETA? What's the distribution of initial ETA on sending recommendations to service providers? Are movement recommendations acting as expected? How does the distribution of service providers targeted change after movement recommendations are sent? How are metrics (e.g. eyeball ETA) on rider side affected?

In another example, the progress output processing service 160 can determine if a service provider is progressing toward the pickup location once they accept a service request, which can be used to detect service provider fraud and attempts to game the system. For example, a service provider may accept a service request but have no intention of picking up the user so that they can get a cancellation fee. To prevent such fraud, any cancellation fee can be waived for the user if the progress detection system detects that the service provider was ignoring the pickup. In other cases, the fare can be adjusted if the service provider was not making sufficient progress towards the destination on a ride.

In some use cases, the progress output processing service 160 can generate a warning to be sent to the service provider indicating that the service provider is not progressing towards the target. These warnings can be displayed on a user interface of the transport application 191 running on the service provider device 190.

Figures 2A, 2B:
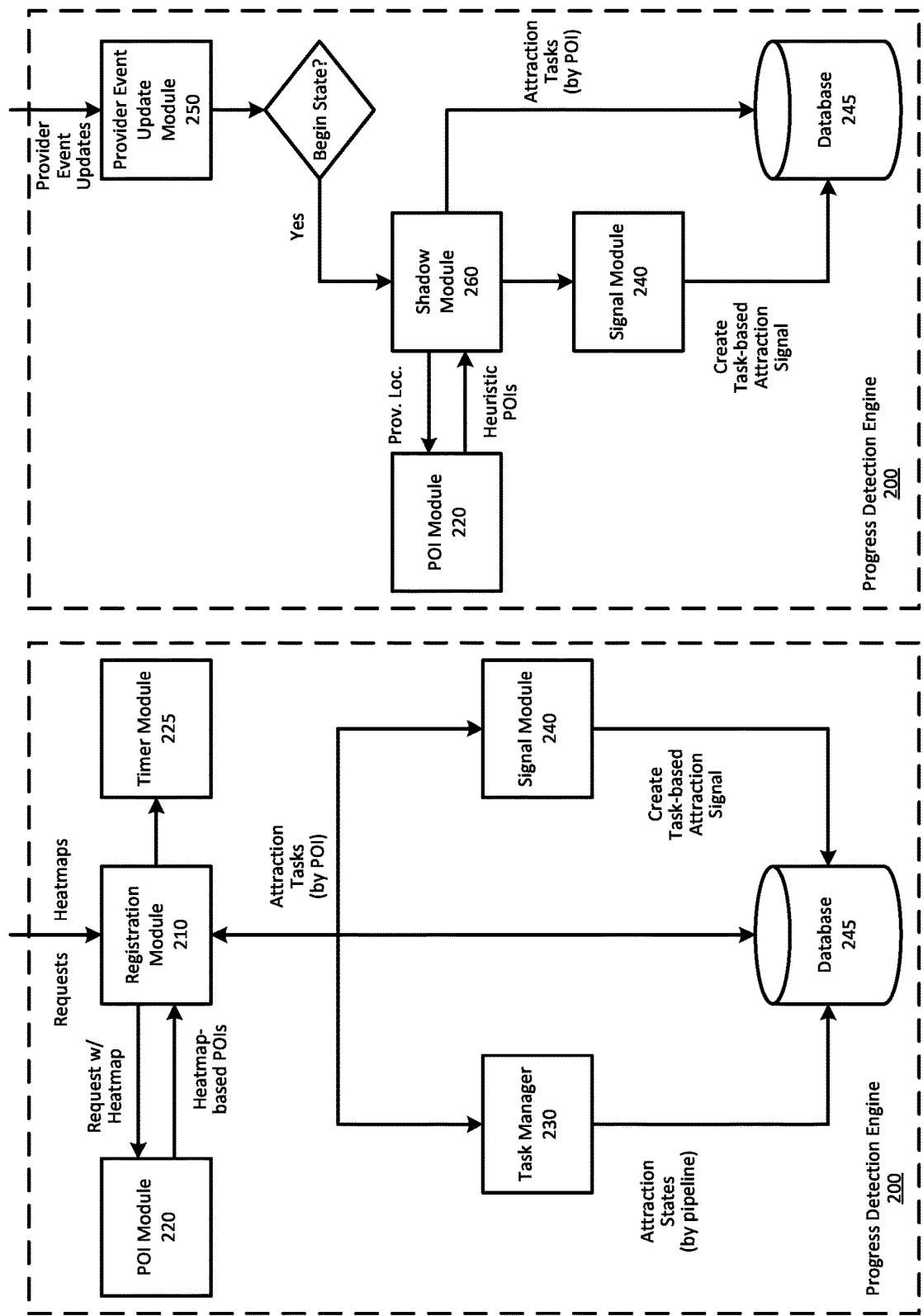
FIGS. 2A and 2B are block diagrams illustrating an example task registration architecture, according to examples described herein.

FIGS. 2A and 2B are block diagrams illustrating an example task registration architecture. In some implementations, a progress detection engine 200 supports an online or offline registration process through a remote procedure call (RPC) interface to register either a single task or tasks in bulk.

In some aspects, customer services, executing as part of the on-demand arrangement service managed by the network computer system 100, transmit registration requests to the registration module 210 of the progress detection engine 200. Each of the registration requests can include a set of requirements, which the components of the progress detection engine 200 use to build the attraction tasks for one or more providers. Based on task configuration, attraction states of different measurement models and task-based attraction signal entities are created accordingly.

In some examples, a provider can have multiple active attraction tasks at the same time, each of which can have different target locations. These attraction tasks can also differ by function and the models used to create the tasks. For example, a provider may have one attraction task created using a heatmap-based algorithm, such as described in FIG. 2A, and another attraction task created using a heuristic algorithm, such as described in FIG. 2B.

In some aspects, a service generating heatmaps sends a refreshed heatmap to the progress detection engine 200 periodically (e.g., every two minutes). In one implementation, a heatmap represents a city, metropolitan area, or other geographical region, and is composed of key-value pairs of hexagonally shaped sub-regions. After receiving the refreshed heatmap, the POI module 220 determines heatmap-based points of interest and stores the centroid latitude and longitude coordinates of the points of interest in the database 245.

Based on the points of interest and the set of requirements in the received request, the registration module 210 sets up attraction tasks for progress measurement for the task manager 230 and signal module 240. For example, the registration module 210 can create, for each of the points of interest, an attraction task with a target location corresponding to that point of interest.

In one implementation, the POI module 220 uses the heatmaps to select two measurement destinations: a local maximum hexagon (i.e., sub-region of the heatmap), and a global maximum hexagon. In some aspects, the local maximum hexagon represents a sub-region near the location of the provider with a higher dynamic score (i.e., high demand relative to supply) compared to other nearby sub-regions. The global maximum hexagon represents the sub-region with the highest dynamic score on the heatmap.

To determine the local maximum hexagon, the POI module 220 can perform the following algorithm (where, in one implementation, the PeakZone represents hexagons with the highest scores and the SurgeHill represents an area of contiguous hexagons, centered on the PeakZone, with flat or decreasing scores):

Sort the dynamic scores from highest to lowest into a list S;
While S is not empty:
  Set the highest dynamic score $H_{max}$ as the PeakZone;
  Expand this PeakZone to all neighboring hexagons that have a dynamic score equal to $H_{max}$;
  Create a Marker at the center of PeakZone;
  Continue to expand SurgeHill outward by moving to neighboring hexagons with equal or lower dynamic scores;
  Remove SurgeHill from S.

FIG. 2B illustrates components of the progress detection engine 200 that can create an attraction task using a heuristic algorithm. A provider event update module 250 receives data corresponding to an event update for a provider. If the provider is still in a begin state, the shadow module 260 can create one or more attraction tasks for the provider for each point of interest that the POI module 260 identifies using a heuristic algorithm.

In some aspects, the POI module 220 uses various signals and metrics to forecast supply and demand for the region in which the provider is located. Based on this forecast, the POI module 220 can generate one or more heuristic points of interest. The shadow module 260 can then create attraction tasks for the provider for each of the points of interest, and the signal module 240 can create task-based attraction signals. The attraction tasks and signals can be stored in the database 245 for later retrieval during task processing. In addition, in contrast to the heatmap-based algorithm, the heuristic algorithm can predict where the provider may go without actively showing them a recommendation.

Figure 3:
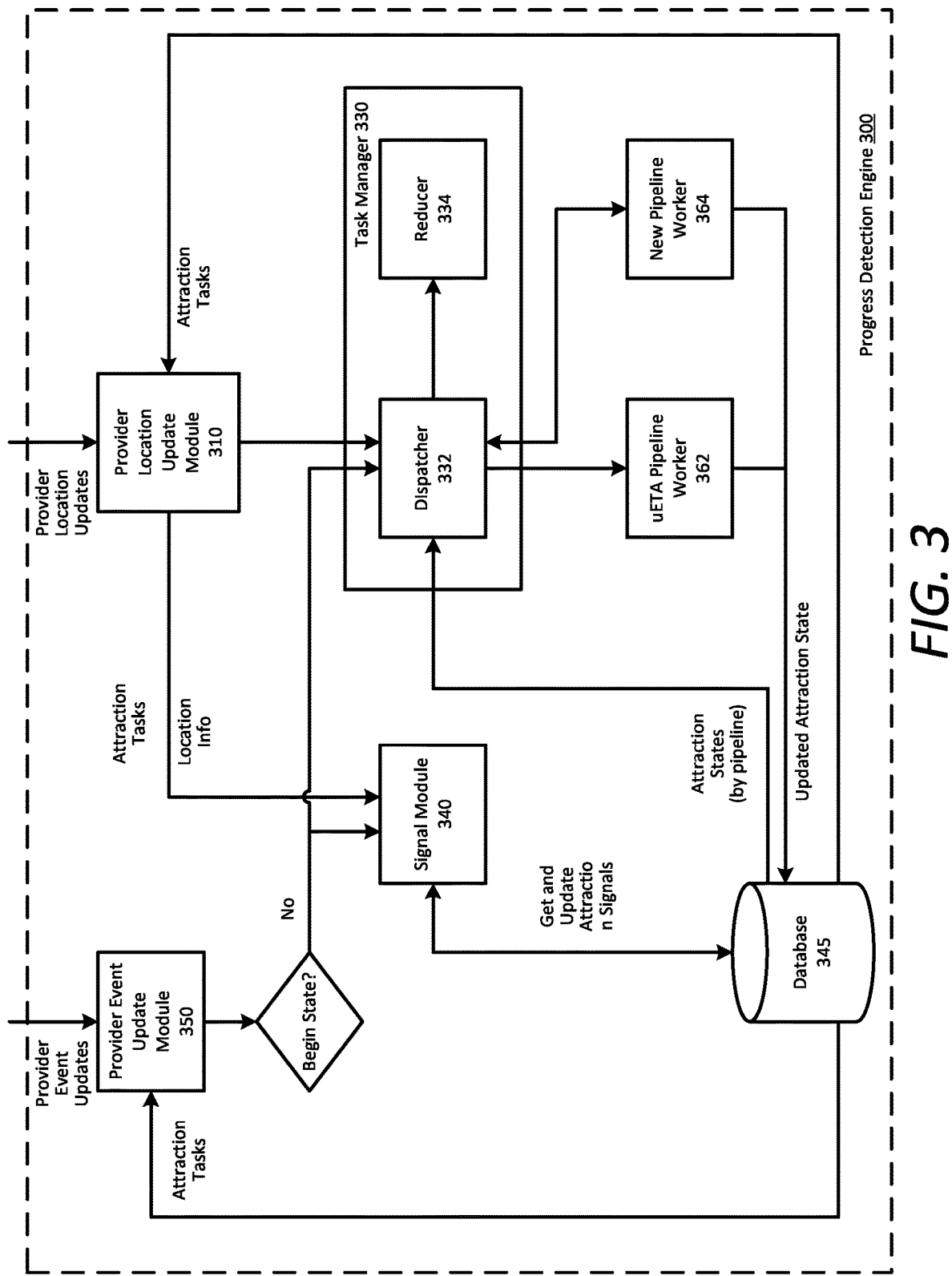
FIG. 3 is a block diagram illustrating an example task processing architecture, according to examples described herein.

FIG. 3 is a block diagram illustrating an example task processing architecture. In some aspects, the progress detection engine 300 provides session-based measurement for registered attraction tasks. A measurement session starts when a provider becomes open (e.g., the provider comes online, after trip completion, cancellation, or expiration), and ends by configuration of the attraction task registered, which includes events such as the provider going offline, accepting a request, and expiration of the task, which can be defined by the end time of a task. In some examples, a session starts when a new attraction task is created, such as on refresh of the local heatmap.

In some aspects, the progress detection engine 300 processes attraction tasks based on event updates and provider location updates per hexagon. A provider event update module 350 processes the provider event updates, and a provider location update module 310 processes provider location updates. This processing can determine whether the updates are valid or invalid. The core logic of attraction measurement is shared between these event and location updates.

On receiving valid updates for a provider, the progress detection engine 300 retrieves active attraction tasks associated with the provider. On one path, these tasks and real-time stats are passed to a signal module 340 to update. The signal module 340 gets and updates attraction signals, including, among other signals, whether the provider has received a trip request, whether the provider has accepted the request, whether the provider has arrived at a target location, and a distance result. In some aspects, the signal module 340 keeps track of session-based stats related to attraction tasks.

On another path, provider updates are also passed to the task manager 330 to measure provider progress/attraction. For each attraction task, the task manager 330 retrieves associated attraction states from the database 345 then uses a dispatcher module 332 to dispatch each attraction state to a uETA pipeline worker 362 based on task configuration. Each uETA pipeline worker 362 is responsible of handling state transitions of a specific measurement model and sending statistics to corresponding logging functions. As an example, a uETA pipeline worker 362 is responsible of handling attraction state transitions of the shrinking circle attraction model illustrated in FIG. 4.

In some aspects, a provider's attraction towards a target location can be measured by multiple models at the same time, and different models can have their own mechanisms for state management when a provider event/location update happens. In the progress detection engine 300, an attraction state is used to track state transitions of each model across the lifecycle of an attraction task. Based on the task configuration, an attraction task can be measured by multiple types of models, and each model may have multiple sets of parameters. Thus an attraction task can have multiple associated attraction states.

In further aspects, the task manager 300 also implements a reducer module 334 to support aggregated attraction analysis over multiple POIs when a session ends. A new pipeline worker 364 can pipe computed attraction scores to logging functions for offline analysis and visualization.

Figure 4:
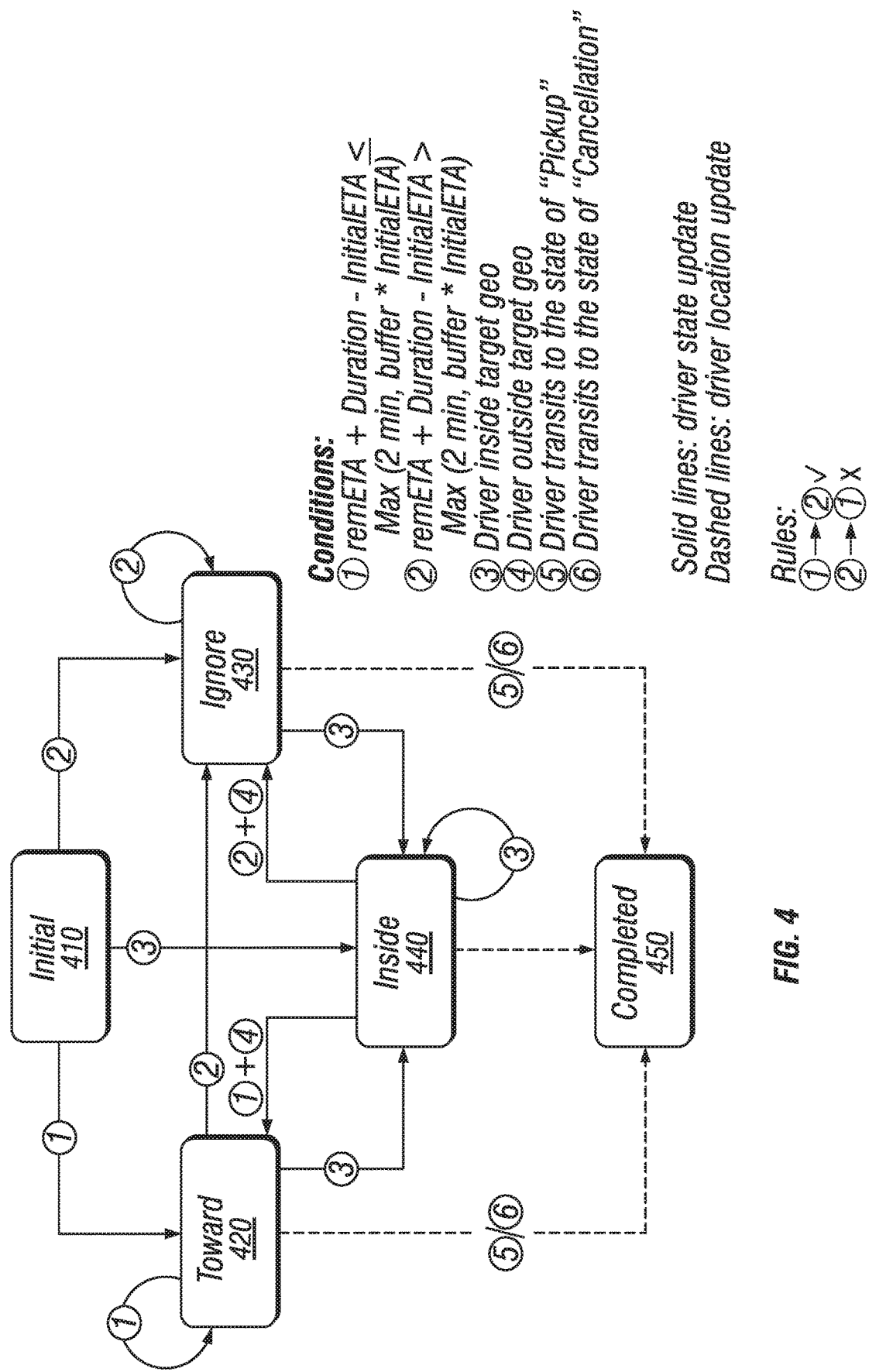
FIG. 4 is a block diagram illustrating a shrinking circle attraction model used for real-time progress monitoring, according to examples described herein.

FIG. 4 is a block diagram illustrating a shrinking circle attraction model used for real-time progress monitoring. In some implementations, a progress detection engine operates as a backend service that monitors whether a service provider is making progress towards a target (e.g., a pick up or drop off location) according to the shrinking circle attraction model. Upon processing service provider location or service state updates, the progress detection engine uses the service provider's current attraction state, initial and current estimated times to arrival (ETA) to the target, and duration of time elapsed to determine whether the service provider remains in the current attraction state or moves to a different attraction state. In some examples, a service provider can be in one of five states: initial 410, toward 420, ignore 430, inside 440, and completed 450.

In one implementation, the progress detection engine determines the initial ETA to the target of the service instruction from a starting position of a computing device of a service provider within a geographic area. For example, a service provider may receive a movement recommendation to travel to a target location that is estimated to be 10 minutes away from the service provider's starting location. Upon creation of the movement recommendation task, the service provider is considered to be in the initial attraction state 410.

The progress detection engine remotely monitors the computing device of the service provider to receive provider data corresponding to the current position of the computing device as the service provider travels within the geographic area, whether towards or away from the target location. In some aspects, whenever the service provider crosses from one sub-region to another or after the passage of 60 seconds where the service provider remains in the same sub-region, the progress detection engine calculates a duration of time that has passed since the initial ETA was estimated and estimates a remaining ETA based on the expected travel time from the service provider's current position to the target. The progress detection engine then checks a set of progress conditions to determine whether to move the service provider to a different attraction state.

As illustrated in FIG. 4, one example for an attraction model tracking a "pickup" task implements six progress conditions that the progress detection engine checks for:
1. remETA+Duration−InitialETA<=Max (2 min, buffer*InitialETA);
2. remETA+Duration−InitialETA>Max (2 min, buffer*InitialETA);
3. Service provider inside target geo;
4. Service provider outside target geo;
5. Service provider transits to the state of "Pickup"; and
6. Service provider transits to the state of "Cancellation."

For condition #1, if the remaining ETA plus duration elapsed minus initial ETA is equal to or below a threshold of the greater of 2 minutes or the initial ETA times a predetermined buffer value, the service provider is considered to be progressing towards the target. The buffer value is a number between 0 and 1 that is chosen to allow a margin of flexibility to the ETA calculations that the model uses since it is possible that factors such as traffic or weather conditions have changed since the initial ETA was calculated. The buffer value can be set differently for different geographic areas and can be updated based on determined rates of false positives and false negatives.

Using a buffer value of 0.6, if the service provider's initial ETA was 10 minutes and upon an update after 5 minutes with a remaining ETA of 7 minutes, the service provider would be considered to be progressing towards the target since (7+5−10) is less than (10*0.6). As illustrated, service providers meeting condition #1 in the initial attraction state 410 transition to the toward attraction state 420. Service providers meeting condition #1 in the toward attraction state 420 remain there.

For condition #2, if the remaining ETA plus duration elapsed minus initial ETA is above a threshold of the greater of 2 minutes or the initial ETA times a predetermined buffer value, the service provider is considered to be ignoring the target. As illustrated, service providers meeting condition #2 in the initial attraction state 410 transition to the ignore attraction state 430. Service providers meeting condition #2 in the ignore attraction state 430 remain there. In some implementations, once a service provider is in the ignore attraction state 430, the service provider cannot transition to the toward attraction state 420 even if they meet condition #1.

For condition #3, the service provider transitions to the inside attraction state 440 if they are detected within the same geo, or sub-region, as the target location.

For condition #4, the service provider transitions out of the inside attraction state 440 if they are detected outside the same geo, or sub-region, as the target location. This can result in the service provider transitioning to either the toward attraction state 420 or the ignore attraction state 430 based on conditions #1 or #2.

Conditions #5 and #6 check whether the service state of the service provider has changed to indicate that the service provider has picked up the user or whether the ride request was cancelled. In either case, the service provider transitions to the completed attraction state 450. In other examples, as in for a movement recommendation task, conditions #5 and #6 can check for the service provider entering an "accepted" or "off duty" state, respectively.

The progress detection engine can also implement a compliance model based on the attraction states. In one example, if the service provider reaches the completed attraction state 450 through the ignore attraction state 430, the compliance level is set to "failure." When the service provider reaches the ignore attraction state 430, if the session duration is less than the initial ETA, the compliance level is set to "warning" the first time the condition is met. If the session duration is equal to or greater than the initial ETA, the compliance level is set to "failure."

In addition to the scaling circle attraction model illustrated, the progress detection engine can implement other models with different preset conditions, such as service provider needing to move 0.55 miles within the initial 60 seconds, as separate models to detect a service provider's progress towards the target location.

Methodology

Figure 5:
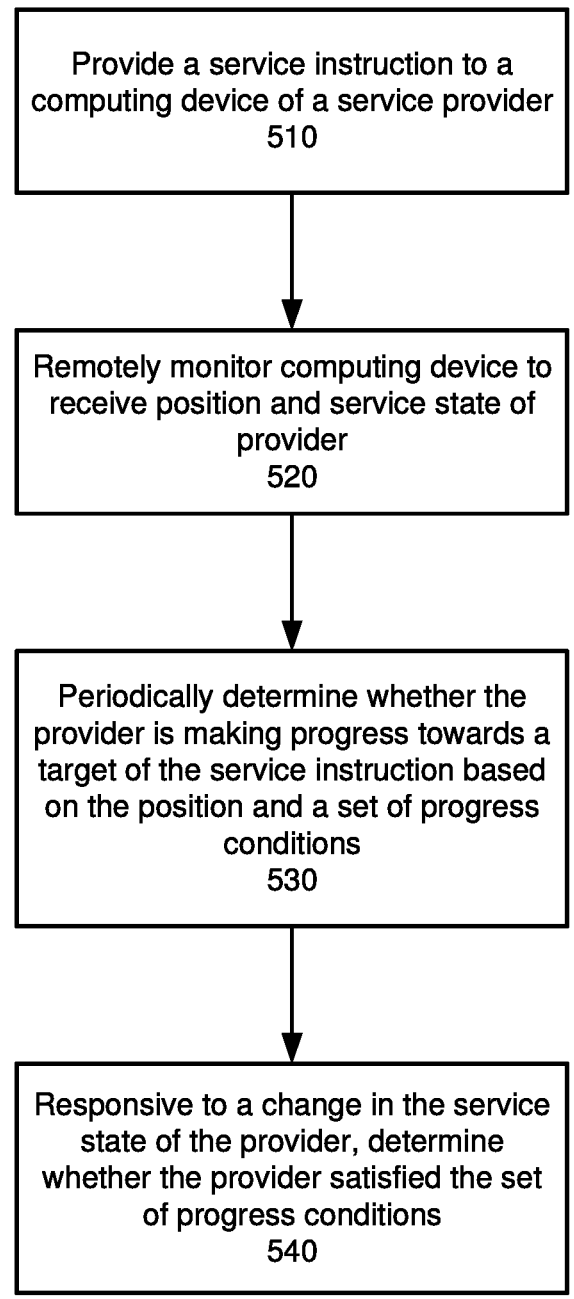
FIG. 5 is a flow chart describing an example method of real-time progress monitoring for a transport provider, according to examples described herein.
Figure 6:
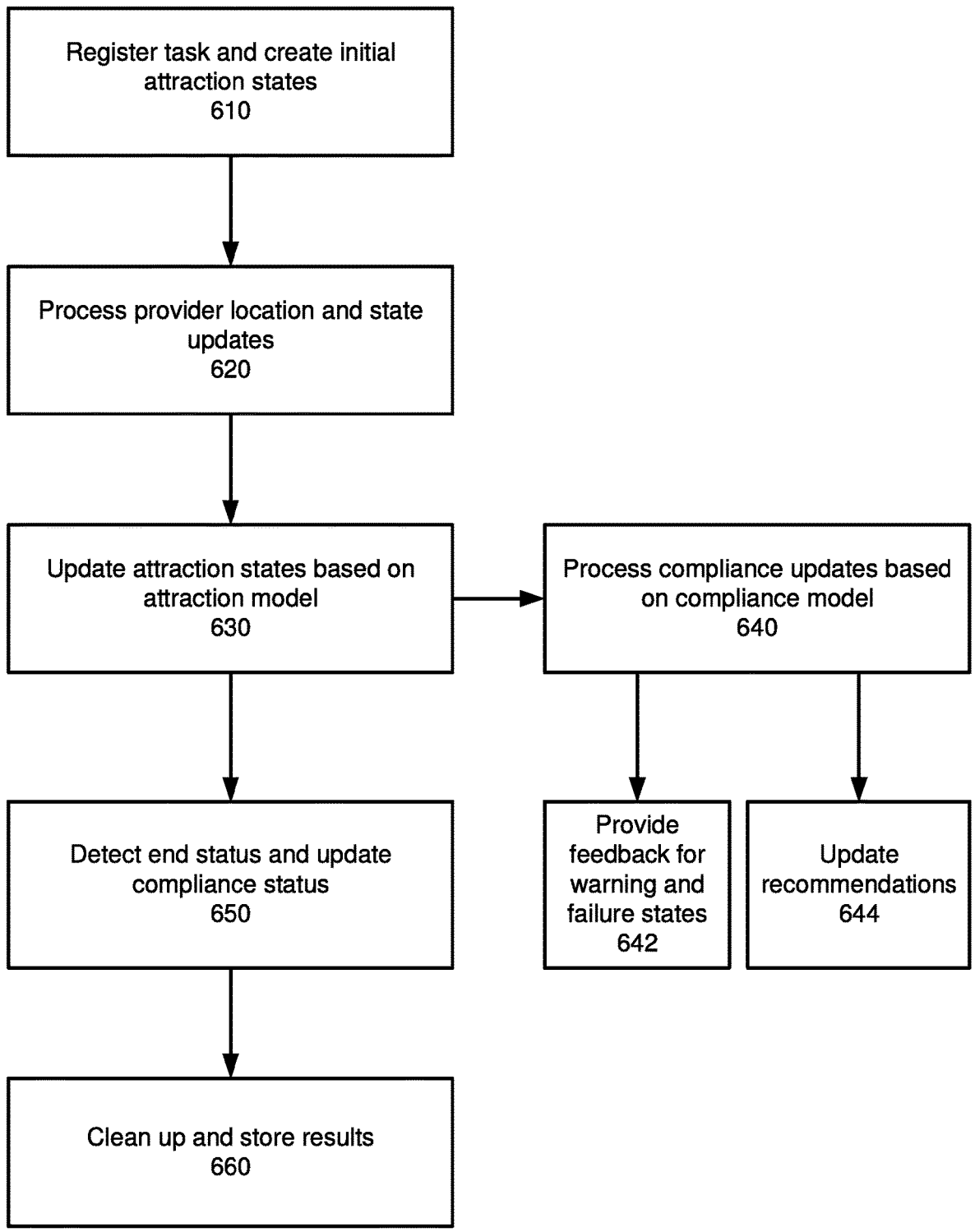
FIG. 6 is a flow chart describing an example method of progress monitoring in a network computer system, according to examples described herein.

FIG. 5 is a flow chart describing an example method of real-time progress monitoring for a transport provider, according to examples described herein. FIG. 6 is a flow chart describing an example method of progress monitoring in a network computer system, according to examples described herein. Although some operations of the methods are described below as being performed by specific components of the computer systems illustrated in FIG. 1, it will be appreciated that these operations need not necessarily be performed by the specific components identified, and could be performed by a variety of components and modules, potentially distributed over a number of machines. Accordingly, references may be made to elements of the network computer system 100 for the purpose of illustrating suitable components or elements for performing a step or sub step being described. Alternatively, at least certain ones of the variety of components and modules described in the network computer system 100 can be arranged within a single hardware, software, or firmware component. It will also be appreciated that some of the steps of these methods may be performed in parallel or in a different order than illustrated.

In the method described in FIG. 5, the network computer system provides, to a computing device of a service provider over a network, a service instruction (510). The service instruction can include offers, such as a service request to pick up and transport a user, and recommendations, such as a movement recommendation encouraging the service provider to relocate to another geographic area that is determined to offer a superior experience for the service provider (e.g., lower idle time, more revenue, etc.).

The network computer system remotely monitors the computing device to receive provider data corresponding to a current position of the computing device, as determined by a location-based resource of the computing device, as the service provider travels within a geographic area. In addition, the network computer system remotely monitors the computing device to receive provider data corresponding to a service state of the service provider (e.g., open, occupied, offline, etc.) (520).

The network computer system periodically determines whether the service provider is making progress towards a target (e.g., a pick up location, movement recommendation location) of the service instruction based on the current position of the computing device and a set of progress conditions (530). Responsive to a change in the service state of the service provider, the network computer system determines whether the service provider satisfied the set of progress conditions (540).

In the method described in FIG. 6, a task service can register tasks to track the progress of any movement recommendations sent to service providers or to track the progress of a service provider towards a pick up or drop off location. In addition, a progress detection engine can determine whether the task should be monitored via per-provider attraction (e.g., offer) or citywide attraction (e.g., hexcentives), and create attraction/initial attraction states accordingly (610).

In one implementation, to track progress in real-time, the progress detection engine reads logs of service provider location and service state that are processed by upstream services (620). On receiving a location update of a service provider, the progress detection engine loads existing attractions related to the service provider from a database, and for each attraction task, updates the attraction states based on the estimated time to arrival and time elapsed (630). In some examples, the progress detection engine updates attraction states each time the service provider crosses from one sub-region to another or every 60 seconds if the service provider remains within one sub-region during that time.

The progress detection engine can process compliance updates based on a compliance model using the attraction states (640). In one example, if the service provider reaches the completed attraction state through the ignore attraction state, the compliance level is set to "failure." When the service provider reaches the ignore attraction state, if the session duration is less than the initial ETA, the compliance level is set to "warning" the first time the condition is met. If the session duration is equal to or greater than the initial ETA, the compliance level is set to "failure."

In some use cases, a progress output processing service can generate a warning to be sent to the service provider indicating that the service provider is not progressing towards the target (642). These warnings can be displayed on a user interface of the transport application running on the service provider device.

The progress output processing service can determine whether service providers are following repositioning recommendations while online and not in-service. The progress detection system further provides a feedback loop for movement recommendations to service providers to improve supply provisioning. For example, the progress detection system can determine what percent of service providers are following a recommendation, and if too many or too few are following, the supply provisioning service can adjust accordingly (644).

If the service provider's service state changes to indicate that a given task (e.g., pick up, drop off, movement recommendation) is complete (whether successful or canceled), the progress detection system stops tracking the service provider and can update the compliance status as "successful" or "failure" (650). The progress detection system logs the relevant information, including the task, a timestamp, the service provider ID, and the compliance status (660).

Service Provider Device

Figure 7:
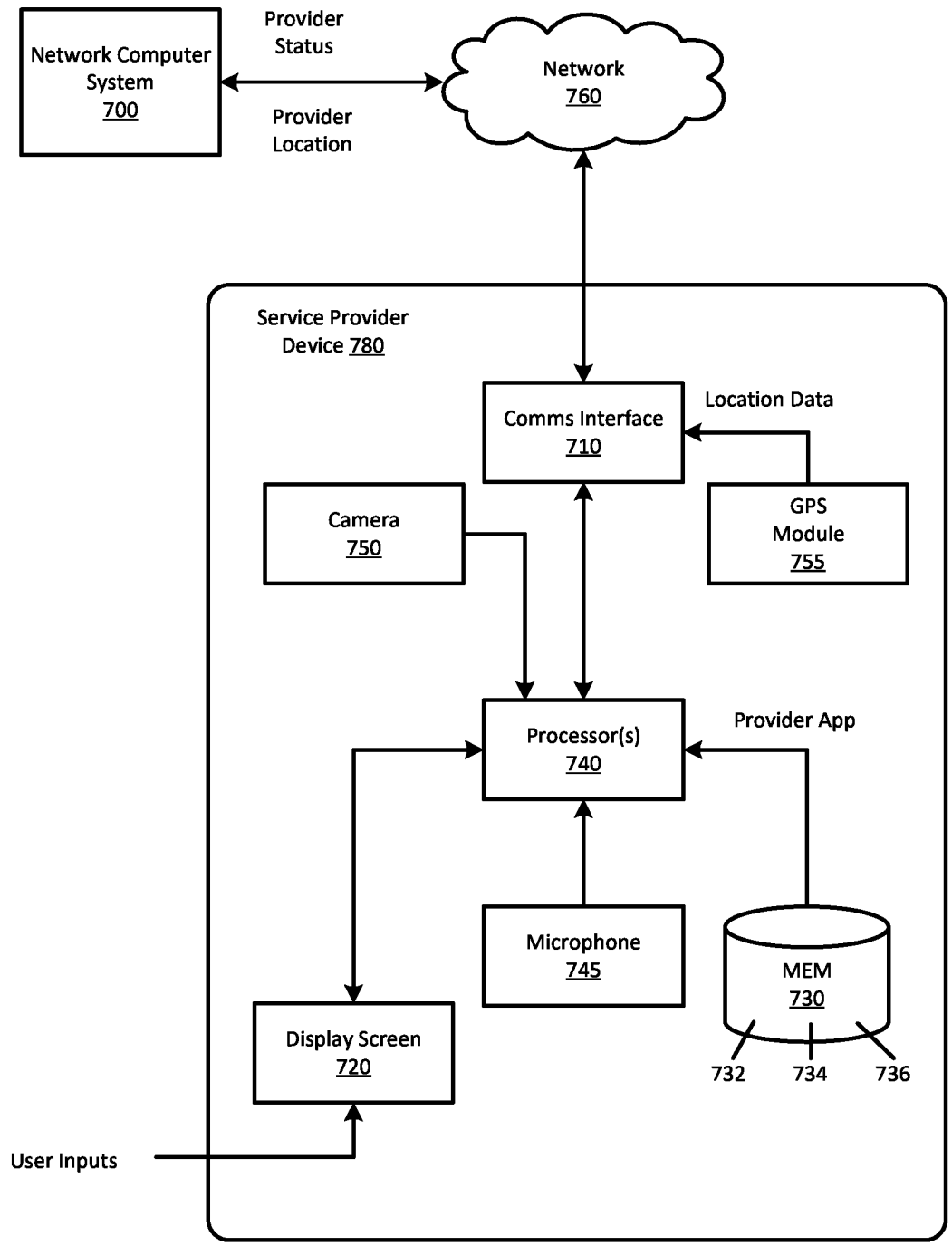
FIG. 7 is a block diagram illustrating an example computing device executing and operating a designated transport application for communicating with a network transport service, according to examples described herein.

FIG. 7 is a block diagram illustrating an example computing device executing and operating a designated transport application for communicating with a network transport service, according to examples described herein. In many implementations, the service provider device 780 can comprise a mobile computing device, such as a smartphone, tablet computer, laptop computer, VR or AR headset device, and the like. As such, the service provider device 780 can include typical telephony features such as a microphone 745, a camera 750, and a communication interface 710 to communicate with external entities using any number of wireless communication protocols. In certain aspects, the service provider device 780 can store a designated application (e.g., a service provider application 732) in a local memory 730. In many aspects, the service provider device 780 further stores information corresponding to a contacts list 734 and calendar appointments 736 in the local memory 730. In variations, the memory 730 can store additional applications executable by one or more processors 740 of the service provider device 780, enabling access and interaction with one or more host servers over one or more networks 760.

In response to user input, the service provider application 732 can be executed by a processor 740, which can cause an application interface to be generated on a display screen 720 of the service provider device 780. The application interface can enable the service provider to, for example, check current price levels and availability for the on-demand arrangement service. In various implementations, the application interface can further enable the service provider to select from multiple ride service types, such as a carpooling service type, a regular ride-sharing service type, a professional ride service type, a van on-demand service type, a luxurious ride service type, and the like.

The provider can enter various states or modes, such as an online mode or a pause state via user inputs provided on the application interface. For example, the provider can choose a duration for the pause state and select a facility from a recommended list of facilities to accommodate the provider during the pause state. As provided herein, the service provider application 732 can further enable a communication link with a network computer system 700 over the network 760, such as the network computer system 100 as shown and described with respect to FIG. 1. Furthermore, as discussed herein, the service provider application 732 can display requester information on the application interface that includes data regarding a service requester so that the provider can choose whether to accept or reject a service invitation received from the network computer system 700.

The processor 740 can transmit the provider status (i.e., modes the provider is in, or the service state) via a communications interface 710 to the backend network computer system 700 over a network 760. In various examples, the service provider device 780 can further include a GPS module 755, which can provide location data indicating the current location of the provider to the network computer system 700 to select an appropriate service provider to fulfill user service requests. In alternative aspects, hard-wired circuitry may be used in place of or in combination with software instructions to implement aspects described herein. Thus, aspects described are not limited to any specific combination of hardware circuitry and software.

Hardware Diagram

Figure 8:
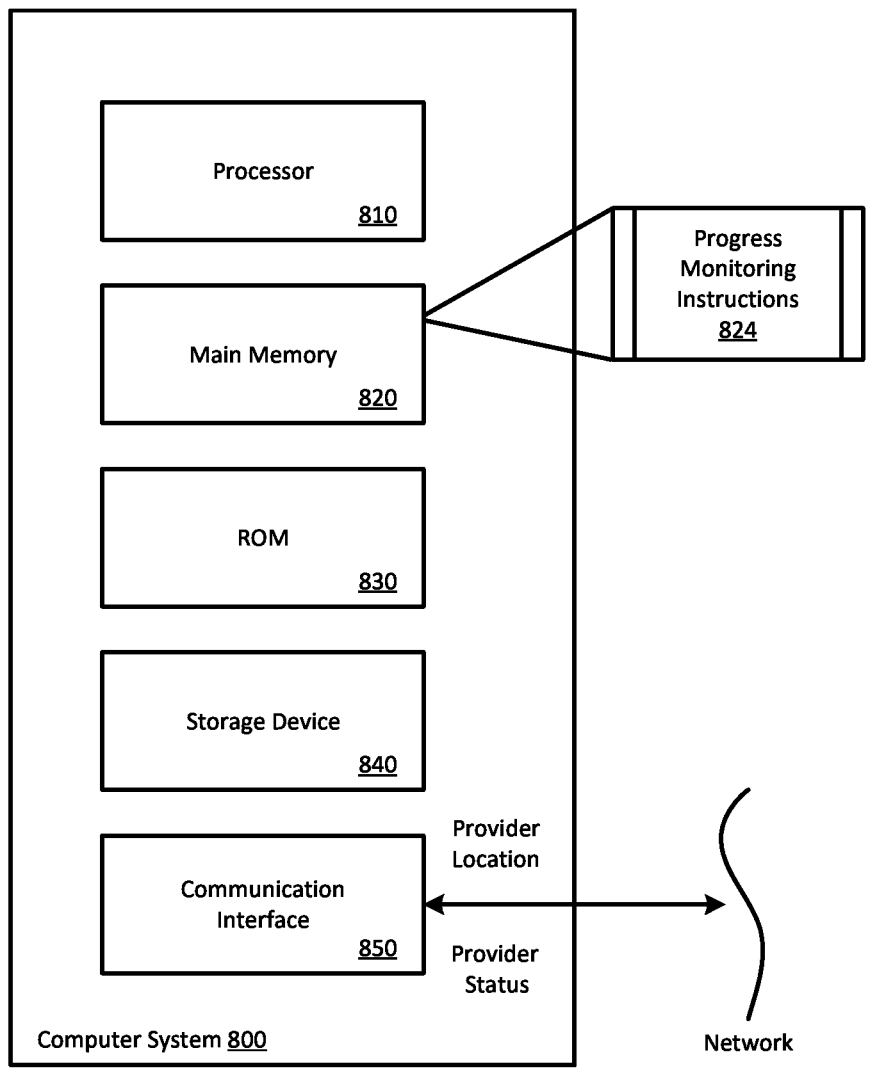
FIG. 8 is a block diagram illustrating a computer system upon which examples described herein may be implemented.

FIG. 8 is a block diagram that illustrates a computer system upon which examples described herein may be implemented. A computer system 800 can be implemented on, for example, a server or combination of servers. For example, the computer system 800 may be implemented as part of a network service for providing on-demand services. In the context of FIG. 1, the network computer system 100 may be implemented using a computer system 800 such as described by FIG. 8. The network computer system 100 may also be implemented using a combination of multiple computer systems as described in connection with FIG. 8.

In one implementation, the computer system 800 includes processing resources 810, a main memory 820, a read-only memory (ROM) 830, a storage device 840, and a communication interface 850. The computer system 800 includes at least one processor 810 for processing information stored in the main memory 820, such as provided by a random access memory (RAM) or other dynamic storage device, for storing information and instructions which are executable by the processor 810. The main memory 820 also may be used for storing temporary variables or other intermediate information during execution of instructions to be executed by the processor 810. The computer system 800 may also include the ROM 830 or other static storage device for storing static information and instructions for the processor 810. A storage device 840, such as a magnetic disk or optical disk, is provided for storing information and instructions.

The communication interface 850 enables the computer system 800 to communicate with one or more networks (e.g., a cellular network) through use of the network link (wireless or wired). Using the network link, the computer system 800 can communicate with one or more computing devices, one or more servers, and/or one or more self-driving vehicles. In accordance with some examples, the computer system 800 receives service requests from mobile computing devices of individual users. The executable instructions stored in the memory 830 can include progress monitoring instructions 824 to perform one or more of the methods described herein when executed.

By way of example, the instructions and data stored in the memory 820 can be executed by the processor 810 to implement an example network computer system 100 of FIG. 1. In performing the operations, the processor 810 can handle service requests and provider statuses and submit service invitations to facilitate fulfilling the service requests. The processor 810 executes instructions for the software and/or other logic to perform one or more processes, steps and other functions described with implementations, such as described by FIGS. 1 through 5.

Examples described herein are related to the use of the computer system 800 for implementing the techniques described herein. According to one example, those techniques are performed by the computer system 800 in response to the processor 810 executing one or more sequences of one or more instructions contained in the main memory 820. Such instructions may be read into the main memory 820 from another machine-readable medium, such as the storage device 840. Execution of the sequences of instructions contained in the main memory 820 causes the processor 810 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A network computer system for managing an on-demand transport service, comprising:
   one or more processors; and
   a memory storing instructions that, when executed by the one or more processors, cause the network computer system to perform operations comprising:
   providing a service instruction to a computing device of a service provider over a network;
   determining an initial estimated time to arrival (ETA) to a target of the service instruction from a starting position of the computing device of the service provider, as determined by a location-based resource of the computing device of the service provider;
   remotely monitoring the computing device to receive service provider data corresponding to (i) a current position of the computing device as the service provider travels within a geographic area, and (ii) a service state of the service provider;
   updating (i) a remaining ETA to the target from the current position of the computing device of the service provider, and (ii) a duration of time elapsed since the initial ETA was determined; and
   comparing the remaining ETA, the duration of time elapsed, and the initial ETA to a predetermined threshold to determine whether the service provider is progressing towards the target.

2. The network computer system of claim 1, further comprising determining, in response to a change in the service state of the service provider, whether the service provider satisfied a set of progress conditions, the set of progress conditions including whether the service provider was determined to be progressing towards the target.

3. The network computer system of claim 1, wherein the service provider is determined to be progressing towards the target when the duration of time elapsed added to the difference between the remaining ETA and the initial ETA is below the predetermined threshold.

4. The network computer system of claim 1, wherein the initial ETA is based at least on a distance between the starting position of the computing device of the service provider and the target and traffic conditions in the geographic area.

5. The network computer system of claim 2, further comprising:
flagging the service provider as being within an attraction state of a plurality of attraction states based on the set of progress conditions.

6. The network computer system of claim 5, further comprising:
determining a compliance with the service instruction based on the attraction state of the service provider.

7. The network computer system of claim 2, further comprising instructions to perform operations comprising:
selectively displaying content on a user interface of the computing device of the service provider based on whether the service provider satisfied the set of progress conditions.

8. The network computer system of claim 7, wherein the content is a warning regarding the service instruction.

9. A method of managing an on-demand transport service, the method being implemented by one or more processors and comprising:
providing a service instruction to a computing device of a service provider over a network;
determining an initial estimated time to arrival (ETA) to a target of the service instruction from a starting position of the computing device of the service provider, as determined by a location-based resource of the computing device of the service provider;
remotely monitoring the computing device to receive service provider data corresponding to (i) a current position of the computing device as the service provider travels within a geographic area, and (ii) a service state of the service provider;
updating (i) a remaining ETA to the target from the current position of the computing device of the service provider, and (ii) a duration of time elapsed since the initial ETA was determined; and
comparing the remaining ETA, the duration of time elapsed, and the initial ETA to a predetermined threshold to determine whether the service provider is progressing towards the target.

10. The method of claim 9, further comprising determining, in response to a change in the service state of the service provider, whether the service provider satisfied a set of progress conditions, the set of progress conditions including whether the service provider was determined to be progressing towards the target.

11. The method of claim 9, wherein the service provider is determined to be progressing towards the target when the duration of time elapsed added to the difference between the remaining ETA and the initial ETA is below the predetermined threshold.

12. The method of claim 9, wherein the initial ETA is based at least on a distance between the starting position of the computing device of the service provider and the target and traffic conditions in the geographic area.

13. The method of claim 10, further comprising:
flagging the service provider as being within an attraction state of a plurality of attraction states based on the set of progress conditions.

14. The method of claim 13, further comprising:
determining a compliance with the service instruction based on the attraction state of the service provider.

15. The method of claim 13, further comprising instructions to perform operations comprising:
selectively displaying content on a user interface of the computing device of the service provider based on whether the service provider satisfied the set of progress conditions.

16. The method of claim 15, wherein the content is a warning regarding the service instruction.

17. A non-transitory computer-readable medium that stores instructions, executable by one or more processors, to cause the one or more processors to perform operations comprising:
providing a service instruction to a computing device of a service provider over a network;
determining an initial estimated time to arrival (ETA) to a target of the service instruction from a starting position of the computing device of the service provider, as determined by a location-based resource of the computing device of the service provider;
remotely monitoring the computing device to receive service provider data corresponding to (i) a current position of the computing device as the service provider travels within a geographic area, and (ii) a service state of the service provider;
updating (i) a remaining ETA to the target from the current position of the computing device of the service provider, and (ii) a duration of time elapsed since the initial ETA was determined; and
comparing the remaining ETA, the duration of time elapsed, and the initial ETA to a predetermined threshold to determine whether the service provider is progressing towards the target.

18. The non-transitory computer-readable medium of claim 17, further comprising determining, in response to a change in the service state of the service provider, whether the service provider satisfied a set of progress conditions, the set of progress conditions including whether the service provider was determined to be progressing towards the target.

19. The non-transitory computer-readable medium of claim 17, wherein the service provider is determined to be progressing towards the target when the duration of time elapsed added to the difference between the remaining ETA and the initial ETA is below the predetermined threshold.

20. The non-transitory computer-readable medium of claim 17, wherein the initial ETA is based at least on a distance between the starting position of the computing device of the service provider and the target and traffic conditions in the geographic area.

\* \* \* \* \*